(12) United States Patent
Hornung et al.

(10) Patent No.: US 10,419,669 B2
(45) Date of Patent: Sep. 17, 2019

(54) OMNISTEREOSCOPIC PANORAMIC VIDEO (71) Applicant: DISNEY ENTERPRISES, INC., Burbank, CA (US)

(72) Inventors: Alexander Sorkine Hornung, Zürich (CH); Christopher Schroers, Zürich (CH); Jean-Charles Bazin, Zürich (CH)

(73) Assignee: Disney Enterprises, Inc., Burbank, CA (US)

( * ) Notice: Subject to any disclaimer, the term of this patent is extended or adjusted under 35 U.S.C. 154(b) by 260 days.

(21) Appl. No.: 15/408,290

(22) Filed: Jan. 17, 2017

(65) Prior Publication Data

US 2018/0205884 A1 Jul. 19, 2018

(51) Int. Cl.
| | | |
|---|---|---|
| *H04N 5/232* | (2006.01) | |
| *H04N 5/247* | (2006.01) | |
| *G06T 7/55* | (2017.01) | |
| *G06T 3/40* | (2006.01) | |
| *H04N 5/265* | (2006.01) | |
| *H04N 5/225* | (2006.01) | |
| *H04N 13/00* | (2018.01) | |

(52) U.S. Cl.
CPC ....... *H04N 5/23238* (2013.01); *G06T 3/4038* (2013.01); *H04N 5/2258* (2013.01); *H04N 5/23206* (2013.01); *H04N 5/247* (2013.01); *H04N 13/00* (2013.01)

(58) Field of Classification Search
CPC combination set(s) only.
See application file for complete search history.

(56) References Cited

U.S. PATENT DOCUMENTS

| | | |
|---|---|---|
| 6,639,596 B1 | 10/2003 | Shum |
| 6,665,003 B1 | 12/2003 | Peleg |
| 6,795,109 B2 | 9/2004 | Peleg |
| 2003/0035592 A1 | 2/2003 | Cornog |
| 2011/0243390 A1* | 10/2011 | Eggert .............. G06T 7/269 382/107 |
| 2012/0019614 A1 | 1/2012 | Murray |
| 2012/0249730 A1 | 10/2012 | Lee |
| 2013/0076856 A1 | 3/2013 | Wakabayashi |

(Continued)

FOREIGN PATENT DOCUMENTS

| | | |
|---|---|---|
| JP | 2001148012 | 5/2001 |
| JP | 2011164325 | 8/2011 |

(Continued)

OTHER PUBLICATIONS

Li et al: 'Stereo Reconstruction From Multiperspective Panoramas', IEEE Transactions on Pattern Analysis and Machine Intelligence, IEEE Computer Society, USA, vol. 26, No. 1, Jan. 1, 2004 (Jan. 1, 2004), pp. 45-62, XP001185855.

(Continued)

*Primary Examiner* — Alexander Gee
(74) *Attorney, Agent, or Firm* — Esplin & Associates, PC (57) ABSTRACT

Systems and methods to generate omnistereoscopic panoramic videos are presented herein. Depth information, flow fields, and/or other information may be used to determine interpolated frame images between adjacent frame images. An omnistereoscopic panoramic video may be used in a real-world VR application.

16 Claims, 6 Drawing Sheets

(56) References Cited

U.S. PATENT DOCUMENTS

| | | | |
|---|---|---|---|
| 2013/0236099 A1* | 9/2013 | Yu | G06T 7/248 382/171 |
| 2014/0307045 A1 | 10/2014 | Richardt | |
| 2015/0193970 A1* | 7/2015 | Liu | G06F 3/011 345/420 |
| 2015/0356357 A1* | 12/2015 | McManus | G06K 9/00791 382/104 |
| 2016/0352982 A1* | 12/2016 | Weaver | H04N 5/23238 |
| 2016/0379415 A1* | 12/2016 | Espeset | G06T 15/04 345/633 |
| 2017/0236284 A1* | 8/2017 | Elliethy | G06T 7/33 382/294 |

FOREIGN PATENT DOCUMENTS

| JP | 201176249 | 11/2012 |
|---|---|---|
| WO | 9834195 A1 | 8/1998 |
| WO | 2011162227 | 12/2011 |

OTHER PUBLICATIONS

Peleg et al., 'Omnistereo: Panoramic Stereo Imaging', IEEE Transactions on Pattern Analysis and Machine Intelligence, vol. 23, No. 3, IEEE Computer Society, USA, Mar. 1, 2001, pp. 279-290, XP001005773.

Sawhney et al., 'True Multi-Image Alignment and Its Application to Mosaicing and Lens Distortion Correction', Proceedings of the 1997 IEEE Computer Society Conference on Computer Vision and Pattern Recognition, San Juan, Puerto Rico, Jun. 17-19, 1997, pp. 450-456, XP000776535.

Shum et al., 'Systems and Experiment Paper: Construction of Panoramic Image Mosaics with Global and Local Alignment', International Journal of Computer Vision, vol. 36, No. 2, Kluwer Academic Publishers, Norwell, USA, Jan. 1, 2000, pp. 101-130, XP002578824.

Huang, Ho-Chao, et al., "Panoramic Stereo Imaging System with Automatic Disparity Warping and Seaming", CVGIP Graphical Models and Image Processing, Academic Press, vol. 60, No. 3, May 1, 1998, XP000752681, pp. 196-208.

Shum, Heung-Yeung, et al., "Stereo Reconstruction from Multiperspective Panoramas", The Proceedings of the Seventh IEEE International Conference on Computer Vision, 1999, vol. 1, Sep. 20, 1999, XP010350473, pp. 14-21.

Szeliski, Richard, Image Alignment and Stiching; A Tutorial; Preliminary draft, Jan. 26, 2005, pp. 1-72 pages.

\* cited by examiner

OMNISTEREOSCOPIC PANORAMIC VIDEO

FIELD OF THE DISCLOSURE

The present invention relates generally to generating omnistereoscopic panoramic video.

BACKGROUND

There is a strong consumer interest in a more immersive experience of content, such as real-world virtual reality (VR) video.

SUMMARY

One aspect of the disclosure relates to a system configured to generate omnistereoscopic panoramic video. Omnistereoscopic panoramic video generation may be based on determining omnistereoscopic panoramic frame images. In some implementations, omnistereoscopic panoramic frame image generation may be based on creating two sets of light rays: one for the left eye and one for the right eye, for example with the rays and/or camera directions tangential to a circle. In some implementations, omnistereoscopic panoramic frame image generation may be based on reconstructing a full lightfield and selecting two sets of light rays from lightfield.

The system may include one or more of one or more physical processors, one or more cameras, and/or other components. The one or more physical processors may be configured by machine-readable instructions. Executing the machine-readable instructions may cause one or more physical processors to facilitate generating omnistereoscopic panoramic video. The machine-readable instructions may include one or more of a video component, a depth component, a flow field component, an interpolation component, a stitching component, and/or other components.

The video component may be configured to obtain information defining a set of videos. Individual videos in the set of videos may include visual content, and/or other content. The visual content of an individual video may include frame images. Individual frame images may be captured at individual points in time. The individual videos may depict at least part of a three-dimensional scene. The set of videos may be captured simultaneously by a camera array. For an individual point in time, individual videos in the set of videos may include at least one frame image captured at the individual point in time. For an individual point in time, at least some of the frame images captured at the individual point in time may form an individual set of adjacent frame images at the individual point in time.

The depth component may be configured to determine depth information by reconstructing the three-dimensional scene using the obtained information defining the set of videos, and/or other information. The depth information may include one or more of three-dimensional coordinates of points lying on surfaces within the three-dimensional scene, a depth map, three-dimensional coordinates of surfaces themselves, proxy scene geometry (e.g., a coarse representation of the real scene geometry), and/or other information.

The flow field component may be configured to determine flow fields between related pixels in adjacent frame images in the individual sets of adjacent frame images formed at the individual points in time.

The interpolation component may be configured to determine interpolated frame images between adjacent frame images in the individual sets of adjacent frame images formed at the individual points in time. The interpolated frame images may be determined based on the information defining the set of videos, the depth information, the flow fields, and/or other information.

The stitching component may be configured to generate an omnistereoscopic panoramic video. The omnistereoscopic panoramic video may comprise one or more of frame images included in the obtained set of videos images, interpolated frame images, and/or other information.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
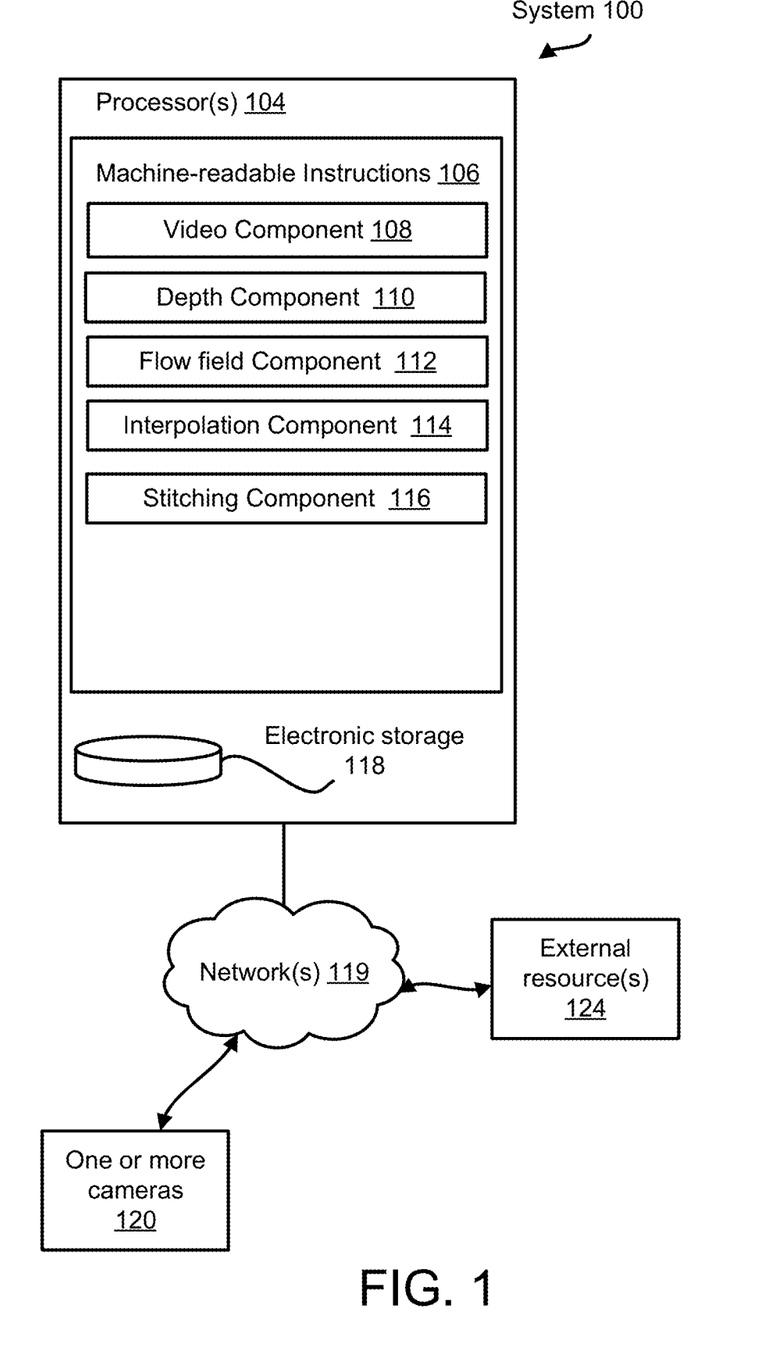
FIG. 1 illustrates a system configured to generate omnistereoscopic panoramic video, in accordance with one or more implementations.

FIG. 1 illustrates a system 100 configured to generate omnistereoscopic panoramic video. The system 100 may be configured to interpolate and/or synthesize frame images (or frame image portions/fragments) between frame images, in particular adjacent frame images captured by adjacent cameras. By virtue of such adjacent frame images, an angular density of frame images available for stitching may be increased.

The system 100 may include one or more of one or more physical processors 104, electronic storage 118, one or more cameras 120, and/or other components. Processor(s) 104 may be configured by machine-readable instructions 106. Executing the machine-readable instructions 106 may cause one or more physical processors 104 to facilitate generating omnistereoscopic panoramic video. The machine-readable instructions 106 may include one or more of a video component 108, a depth component 110, a flow field component 112, an interpolation component 114, a stitching component 116, and/or other components.

Figure 3:
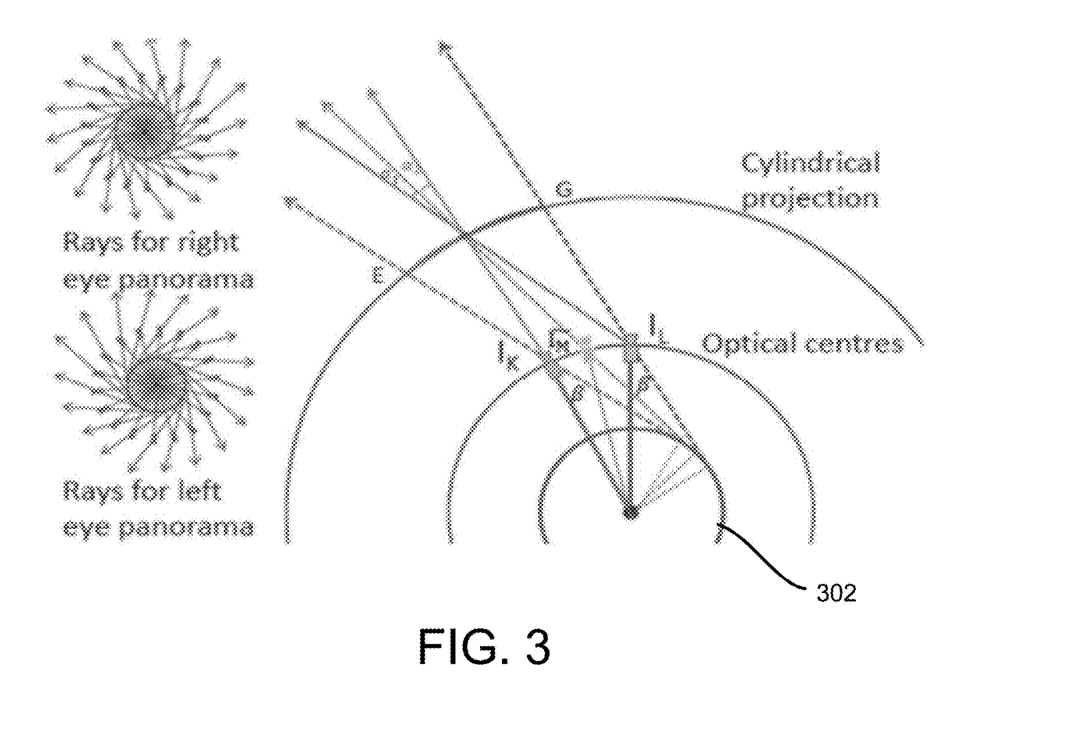
FIG. 3 illustrates principles for achieving an omnistereoscopic effect in accordance with one or more implementations.

Omnistereoscopic panoramic video generation may be based on determining omnistereoscopic panoramic frame images for the video. In some implementations, omnistereoscopic panoramic frame image generation may be based on creating two sets of light rays: one for the left eye and one for the right eye, for example with the rays and/or camera directions tangential to a circle. FIG. 3 illustrates rays required to generate such a panoramic image. In practice, systems may capture a set of adjacent frame image using cameras arranged in an array. A camera array may be a circular array with a principal axis parallel to a plane spanned by the camera array. A camera array may be an unstructured camera array configuration. An omnistereoscopic panoramic frame image may be created by stitching, for individual frame images shown to an individual eye, specific strips from frame images (e.g. obtained frame images, interpolated frame images, and/or lightfield representations of frame images), such that the ray geometry as depicted in FIG. 3 may be approximated. A strip may refer to an individual column from captured frame images, interpolated frame images, and/or lightfield representations of frame images. A strip may be vertical or tilted (e.g., if a camera within a camera is not straight). A strip may be curved and/or have an arbitrary shape. Stitching an omnistereoscopic panoramic frame image may be accomplished by extracting specific strips from individual frame images—dependent on desired stereoscopic output disparities—and/or by combining the strips into a left output view and a right output view. The omnistereoscopic effect may be achieved by collecting rays that may be tangent to a common viewing circle 302, as illustrated in FIG. 3.

An approximation to a desired ray geometry may suffer from inaccuracies of a camera array setup and/or limited angular sampling, resulting in one or more artifacts. For example, in practice the angular sampling may be sparse, e.g. using a limited number of cameras arranged in an array. This may further deteriorate approximation quality and may lead to aliasing artifacts (e.g. seams, truncation, and/or duplication). By using one or more of optical flow correspondences, depth information, and/or other information and/or techniques, visual artifacts may be reduced.

Figure 4:
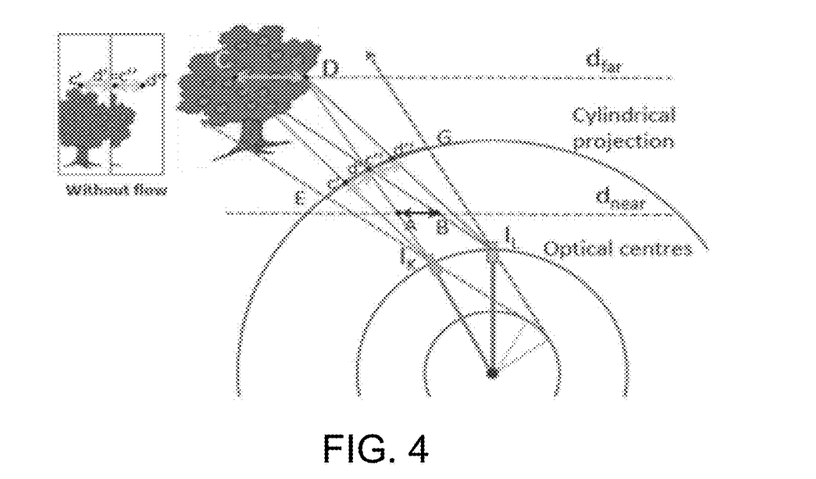
FIG. 4 illustrates aliasing artifacts related to FIG. 3.

In order to characterize the aliasing artifacts, consider FIG. 4. Given two images $I_K$ and $I_L$, the rays may need to be collected at an angle to the principal axis. Let E and G be the intersections of these projected rays with a cylindrical projection surface. Filling the strip EG in the panorama may in general require additional nearby rays to compensate for the relatively coarse angular resolution between input images. An object at distance $d_{far}$ from the camera array center may be further away than the cylindrical projection surface. It is noted that in some implementations described herein, the provision of a cylindrical projection surface 402 may not be applicable since a projection surface at infinity may be utilized. The section CD (in the tree) may be duplicated in the stitched output since its projections c' and d' as well as c" and d" from images $I_K$ and $I_L$, respectively, to the cylindrical projection surface may be visible in both a left eye view and a right eye view. On the other hand, objects in the range AB at distance $d_{near}$ may appear truncated in the final panorama.

Figure 5:
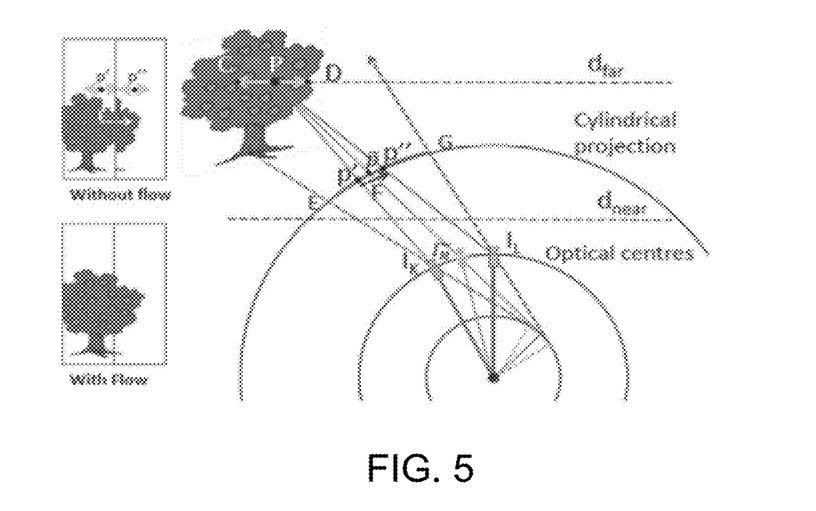
FIG. 5 illustrates a resolution to the aliasing artifacts of FIG. 4.

These aliasing artifacts may be resolved by generating the missing rays using optical flow-based up-sampling, as illustrated in FIG. 5, e.g. by flow field component 112. A point P at distance $d_{far}$ is projected to p' and p" from images $I_K$ and $I_L$, respectively, to the cylindrical projection surface. The optical flow vector F at point p' maps to point p" as p'+F(p')=p". To avoid stitching artifacts, the intermediate point $\tilde{p}$ between p' and p" may be interpolated, effectively synthesizing missing rays at the virtual camera location $\tilde{I}_M$ with the same angle to the principal axes. The same concept may apply to points closer than the cylindrical projection surface, as well as to other camera trajectories.

In some implementations, omnistereoscopic panoramic frame image generation may be based on reconstructing a full lightfield and selecting two sets of light rays from lightfield. A lightfield may be reconstructed from a sparse set of input frame images. A first step may be to map captured input frame images into a coordinate frame of the lightfield by associating individual input frame images with a camera angle using camera calibration parameters. In some implementations, in order to approximate an ideal camera setup, where cameras reside on a circle, individual input frame images may be aligned with an expected input at an angle by applying corresponding homography, to generate transformed images (e.g., defining a "transformed space"). The task of reconstructing the transformed images may include performing an accurate view interpolation in the angle. For an accurate image space approach, it may be important to understand how a given 3D point moves when varying the camera angle.

Rather than considering a projection of a fixed 3D point when rotating a camera about an origin by some angle, changing the point of view may provide a more intuitive understanding: by keeping the camera fixed and rotating the 3D point with an inverse rotation instead, the same trajectory may be obtained. The path can thus be interpreted as observing a 3D point that travels along a cylindrical surface.

Assuming that a depth at a given location may be known, a nonlinear path in image space may be reconstructed by backprojecting, rotating the resulting 3D point, and/or projecting the point using a camera projection matrix that maps 3D world coordinates to pixel coordinates. When representing a given point in cylindrical coordinates, the point's change in position may be linear in the angle. A procedure may include performing a backprojection onto a cylinder with radius, d, followed by a conversion to cylindrical coordinates. By knowing two corresponding points measured at respective angles and their radial depth with respect to an origin, a nonlinear path in image space may be defined. The nonlinear path definition may be in terms of a linear interpolation in the transformed space.

The backprojection onto a cylinder followed by a conversion to cylindrical coordinates may use image space correspondences for an accurate view interpolation (e.g., via interpolation component 114). This interpolation may still depends on a depth of the scene point as it determines the radius of the cylinder. However, the transformation an image may undergoes may be constant when varying the cylinder radius from 2r to infinity. This may indicate that trajectories of points may be approximated by using a very large cylinder radius, even when they are relatively close. Varying the cylinder radius to infinity may be equivalent to letting the camera circle radios go to zero. Curved lines may become straightened after a transformation which indicates that linear interpolation may be a good approximation to the point trajectory. Due to this insight, we may compute intermediate views (e.g., interpolated frame images) based on image space correspondences.

As a preprocessing step, forward and/or backward optical flows between adjacent frame image pairs may be computed. A slightly adapted method of high accuracy optical flow estimation based on a theory for warping may be utilized by minimizing the energy. The method may use a robust penalization function, a Jacobian, a homography between frame images induced by the plane at infinity. Incorporating the homography into the minimization problem may yields advantages. First, it may allows for a better initialization making it less likely get stuck in local minima. Second, it may result in a more appropriate regularization since non-constant parts of the correspondences may already partially be compensated for by the homography.

Intermediate views may be synthesized using correspondences described previously. When given a camera angle (e.g., between zero and 2 π), the two closest input images may be determined which may be related to the cameras capturing views at given angles. Warp fields may be computed. A novel view from an intermediate angle may be synthesized. A single panoramic image may be obtained by fixing a particular image column to obtain individual strips at different column positions. Correspondingly, a stereoscopic output panorama may be created by picking two strips at different column positions. In some implementations, it may be desirable to have square pixels in an output panorama. Therefore a sampling rate may be determined such that a pixel width in an output panorama may match a pixel height in an input image.

Figure 2:
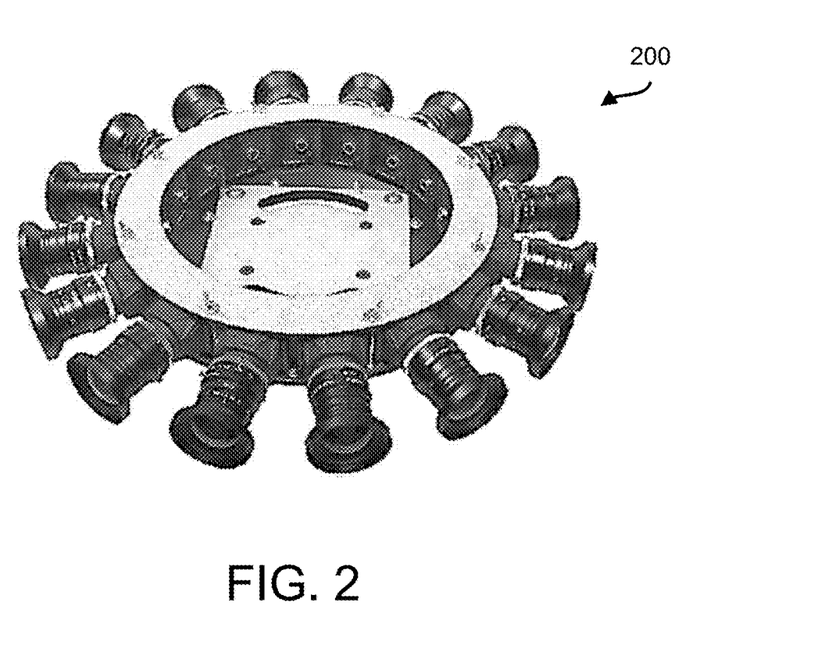
FIG. 2 illustrates an exemplary camera array, in accordance with one or more implementations.

Returning to FIG. 1, in some implementations, one or more cameras 120 may be attached to a support structure to form a camera array (also referred to as a "camera rig"). The camera array may comprise a circular camera array and/or other configurations. In some implementations, individual cameras may have an individual angular field-of-view. By way of non-limiting illustration, an individual camera may have an 80 degree angular field-of-view, and/or other angular field-of-view. The cameras in the camera array may be arranged to cover an aggregate angular field-of-view range. By way of non-limiting illustration, a camera array may be configured to capture a 360-degree aggregate angular field-of-view and/or other aggregate angular ranges. FIG. 2 illustrates an exemplary camera array 200. The camera array 200 may include a set of cameras that may be the same or similar to one or more cameras 120 (shown in FIG. 1 and described herein).

Figure 7:
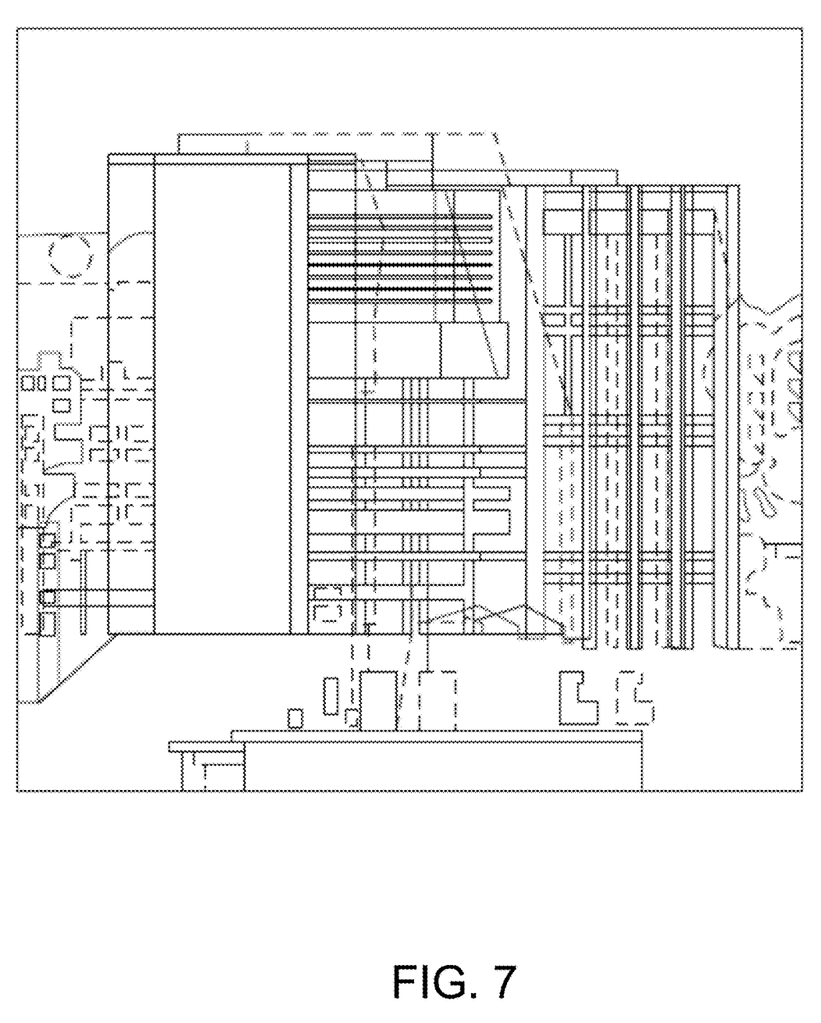
FIG. 7 illustrates a stereoscopic panoramic image.

FIG. 7 shows an exemplary stereoscopic representation in which an image for one eye uses solid lines and an image for the other eye uses dotted lines.

Returning to FIG. 1, video component 108 may be configured to obtain information defining one or more sets of videos. The information defining the one or more sets of video may include one or more video files. In some implementations, a set of videos may be captured by a set of cameras, e.g., a camera array, which may capture video sequentially and/or simultaneously.

Individual videos may include one or more of visual content, audio content, and/or other content. The visual content may include a sequence of frame images and/or other visual content. An individual frame image may comprise an array of pixels. An individual pixel may be defined by values of one or more pixel parameters. Pixel parameters may include one or more of pixel color, pixel location (e.g., two-dimensional location on a frame image), and/or other parameters. The audio content may include audio that may accompany the visual content. The audio content may include audio captured contemporaneously with the visual content and/or otherwise added to the video.

Individual frame images of a video may correspond to individual points in time. In some implementations, the individual points in time may refer to individual instants within a duration of a video where individual frame images may be presented. In some implementations, an individual point in time may refer to a frame number of a frame image within a sequence of frame images. In some implementations, an individual point in time may refer to real-world time when an individual frame image may have been captured by a camera.

In some implementations, individual videos in a set of videos may depict at least part of a three-dimensional scene. The three-dimensional scene may comprise a real-world scene, virtual scene (also referred to as a synthetic scene), and/or augmented reality scene. The three-dimensional scene may include (real and/or virtual) objects positioned within the scene. Individual objects may include one or more surfaces, and/or other features.

In some implementations, one or more videos in an individual set of videos may be captured simultaneously. For example, frame images from multiple videos in a set of videos may correspond to a same or similar point in time. In some implementations, one or more frame images of multiple videos corresponding to the same or similar point in time may form a set of adjacent and/or neighboring images. As used herein, the term "adjacent" may be interpreted in a spatial sense. The term "adjacent" may be used interchangeably with the term "neighboring." For example, frame images may be adjacent images by virtue of one or more of at least partially overlapping the field-of-view depicted in the individual frame images, including one or more of the same objects, and/or other features that may indicate a spatial adjacency of frame images. In some implementations, frame images may be adjacent by virtue of the individual cameras capturing the frame images being viewed and/or sampled from fields of view having a sufficient degree of overlap, and/or varying viewpoints and/or angles.

By way of non-limiting illustration, a set of videos may be captured simultaneously by a camera array. For an individual point in time individual videos in the set of videos may include at least one frame image captured at the individual point in time. For an individual point in time, at least some of the frame images captured at the individual point in time may form an individual set of adjacent frame images at the individual point in time.

The depth component 110 may be configured to determine depth information for a three-dimensional scene depicted within a set of videos, and/or other information. Depth information may include one or more of three-dimensional coordinates of points representing surfaces of objects depicted in the three-dimensional scene, a depth map, and/or other information. Determining three-dimensional coordinates may further facilitate determining depth of the individual points relative a location of a camera array (distance from a camera array center). In some implementations, depth information may be determined by reconstructing the three-dimensional scene using the set of videos.

In some implementations, reconstructing a three-dimensional scene may comprise a step of estimating and/or determining camera calibration parameters (extrinsic and intrinsic) for individual cameras of one or more cameras 120. It is noted that in some implementations camera calibration parameters may be known beforehand and obtained as needed. Intrinsic parameters may define one or more of focal length, image sensor format, principal point, and/or other parameters. Extrinsic parameters may denote coordinate system transformations from 3D real-world coordinates to 3D camera coordinates. Extrinsic parameters may define one or more of position of individual camera centers, individual camera headings in real-world coordinates, and/or other parameters. In some implementations, camera calibration parameters may be determined using one or more of direct linear transformation (DLT) method, Zhang's method, Tsai's algorithm, structure-from-motion with global bundle adjustment, and/or other techniques. In some implementations, in an ideal setup the cameras may lie on a circle of radius r, and a camera intrinsic calibration matrix may be defined using a Kruppa coefficient matrix. In some implementations, with the matrix and by the method of Cholesky factorization, the intrinsic parameters may be obtained.

In some implementations, the estimated and/or determined camera calibration parameters may facilitate some input correction. The shapes of the lenses of individual cameras used to capture individual images may cause lens distortion. Input correction may include one or more of lens undistortion to better approximate a pinhole model, correction of camera orientation, vertical parallax compensation, compact representation via 2D alignment, and/or other types of corrections and/or improvements. Lens undistortion may restore rectilinear projection and/or straight lines. In some implementations, techniques for one or more approximation of a pinhole model, correction of camera orientation, vertical parallax compensation, compact representation via 2D alignment, and/or other types of corrections and/or improvements may include those described in U.S. Pat. No. 9,398, 215 titled "Stereoscopic panoramas" which is incorporated herein in its entirety by reference.

The depth component 110 may be configured to determine depth information using techniques including one or more of Kruppa equations, Mendonca and Cipolla's method, binocular stereo vision, Scale-invariant feature transform (SIFT), Speeded Up Robust Features (SURF), methods computing sparse or dense correspondences, SGM, multiview stereopsis, multi-perspective plane sweep, and/or other techniques. By way of non-limiting illustration, returning to FIG. 5, depth component 110 may be configured to determine one or more of a three-dimensional coordinate of point P, the distance $d_{far}$, and/or other depth information associated with points lying on surfaces in the three-dimensional scene (e.g., the scene including the tree as shown).

Returning to FIG. 1, flow field component 112 may be configured to determine optical flow between corresponding pixels in adjacent frame images in individual sets of adjacent frame images formed at individual points in time. In some implementations, a pair of pixels within a pair of adjacent frame images may correspond based on the pair of pixels depicting the same or similar surface point within a three-dimensional scene. An optical flow field determined for a pair for adjacent frame images may be defined as a vector field comprising a set of vectors. Individual vectors in the set of vectors may be assigned to corresponding pixels in the pair of adjacent frame images. An assigned vector may point from a pixel location of a pixel in one of the frame images to a corresponding pixel location of the corresponding pixel in the other frame image. By way of non-limiting illustration, for a first frame image of such a pair of adjacent frame images, optical flow may be defined as a vector field (e.g., the optical flow field) where an individual pixel on the first frame image has an associated vector that points to a corresponding location of a corresponding pixel in a second frame image.

In some implementations, optical flow fields may be determined using techniques including one or more of phase correlation; block-based methods; differential methods of estimating optical flow such as one or more of Lucas-Kanade method, Horn-Schunck method, Buxton-Buxton method, and/or Black-Jepson method; Discrete optimization methods; high accuracy optical flow estimation based on a theory for warping, and/or other techniques.

The interpolation component 114 may be configured to determine interpolated frame images between adjacent frame images in the individual sets of adjacent frame images formed at the individual points in time. Interpolated frame image may comprise one or more of image-fragments, image-portions, and/or image-strips between adjacent frame images.

Interpolation of an image between a frame image pair may be accomplished by shifting one or more pixels in at least one frame image of the frame image pair along an interpolation path, and/or aggregating the shifted pixels to form the interpolated image. In some implementations, an interpolation path (e.g., the path an individual pixel may be shifted) may be dependent on one or more of a certain fraction of an associated optical flow vector, depth information, and/or other factors that may ensure geometrically consistency with the 3D scene. For example, individual points and/or surfaces in a real-world scene depicted in a frame image may be projected onto individual cylindrical projection surfaces (e.g., having a radius in accordance to the depth of the point and/or surface). The different radii of the individual cylinders may facilitating determining a curvature of an interpolation path that individual ones of the pixels (e.g., that depict the points and/or surfaces) may follow during interpolation.

In some implementations, an interpolation path may be defined by one or both of a trajectory or a sample spacing. The trajectory may follow a curvature determined based scene point depth (e.g. as distance from center of camera array), as described herein. For example, considering two different points on a scene surface, e.g., one point that has a very small depth (e.g., a depth just slightly larger than the radius of camera array) and one point that has very large depth (e.g., close to infinity). Interpolation paths may be quite different. The point with very small depth may have a linear interpolation path in image space whereas the point with large depth may have a linear interpolation path in cylindrical coordinates.

By knowing a depth of a three-dimensional point depicted by a given pixel, a sample spacing which the pixel may be shifted may be determined that may result in geometrically consistent views. Considering how a 3D point moves in image space when a camera rotates off center may facilitate a determination of a sampling along the interpolation path in image space. This also provides verification that the sampling depends on the scene depth.

In some implementations, interpolation of a frame image may synthesize in-between light rays. Synthesizing in-between light rays may be achieved by warping corresponding pixels by a fraction of the determined optical flow, depending on a horizontal angular interpolation factor between two adjacent frame images. Linearly blending between two warped frame images dependent on the interpolation factor may produce a flow-based blending result.

The stitching component 116 may be configured to generate an omnistereoscopic panoramic video based on one or more of obtained frame images (e.g., included in an obtained set of videos), interpolated frame images, and/or other information. The stitching component 116 may be configured to generate omnistereoscopic panoramic frame images of the video for individual points in time by blending pixels and/or frame image-strips from multiple frame images. Blending may be based on optical flow fields, depth information, and/or other information. The omnistereoscopic panoramic video may be generated by using the omnistereoscopic panoramic frame images determined for individual points in time as the frame images of the video. For example, information defining the omnistereoscopic panoramic frame images may be encoded into a video file to define the omnistereoscopic panoramic video.

Stitching an omnistereoscopic panorama may be accomplished by extracting specific strips from individual obtained images and/or lightfield representations of the obtained images—dependent on the desired stereoscopic output disparities and by combining the strips into a left and right output view. The omnistereo effect may be achieved by collecting rays that may be tangent to a common viewing circle (e.g., viewing circle 302 in FIG. 3).

During stitching of multi-perspective frame images, parallax may lead to disturbing seams, i.e. discontinuities between the stitched strips. One way to alleviate this problem may be leveraging the depth information and/or optical flow fields to maintain geometric consistency in the three-dimensional scene. In the context of omnistereoscopic panoramic videos, concise control over the resulting output parallax may be required in order to achieve proper stereoscopic viewing.

One or more features and/or functions of system 100 may facilitate an understanding of the relation between the scene depth and parallax in the output panoramas. As presented herein, stereoscopic panoramic frame images may be created from two column slices. For example, a left panorama may be created from a left slice, the right panorama at a right slice. For simplicity, we may assume that all cameras in the camera array may have a fixed focal length. Furthermore, we consider symmetric cases around a center column of the input frame images. The distance between the left and right columns may control a virtual camera baseline (VCB). This may be analogous to a distance between a pair of cameras in a conventional stereo rig controlling the resulting stereoscopic output parallax.

A particularly intriguing feature of the omnistereoscopic panorama representation is an ability to simulate virtual head motion, e.g., shifting the viewer location within the captured scene. Such features may be achieved by synthesizing a stereoscopic output panorama using two columns from a lightfield may not be not symmetrically placed around a center column. In turn, this may provide a view of the scene from varying perspectives. For application in real-time VR applications, e.g., using a head-tracked display device, a user's head motion has to be properly mapped.

Figure 6:
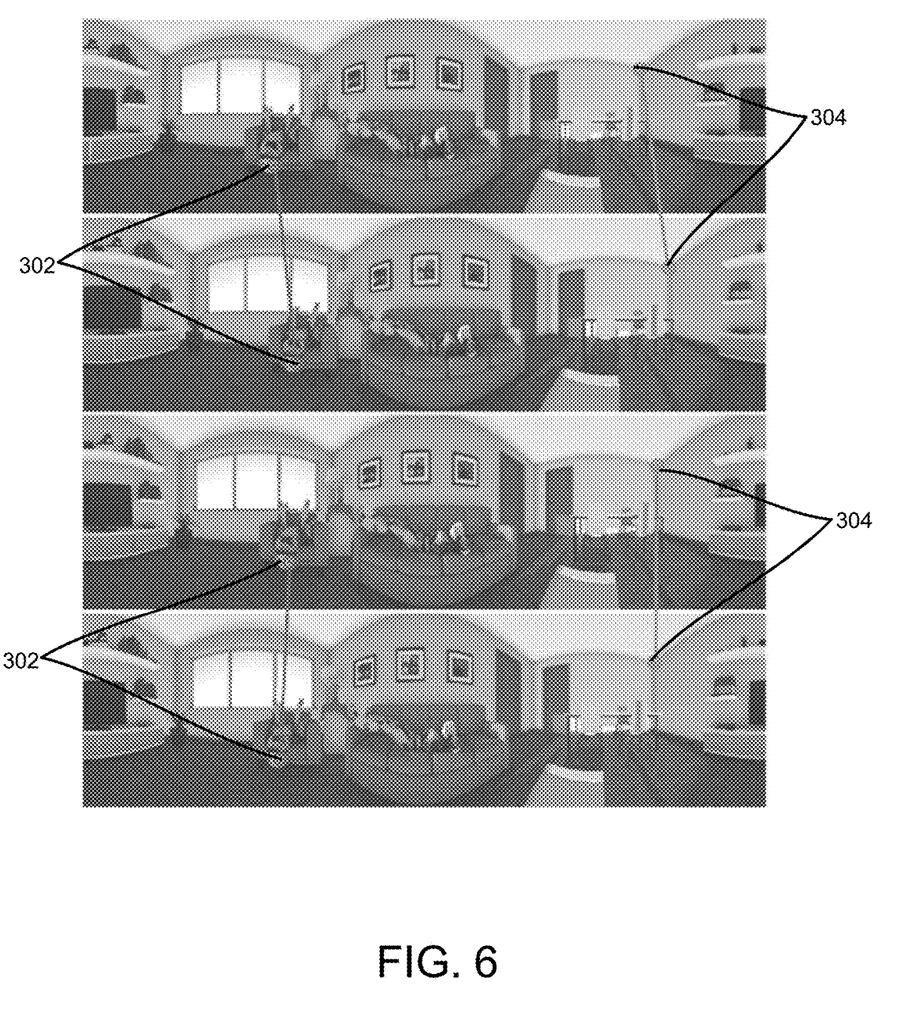
FIG. 6 illustrates an effect of fixing points at infinity.

One issue may rest in that selection of one or more strips from a lightfield for generating a panorama may not only change a perspective onto the scene, but may also modify an orientation of the panorama. In order to synthesize proper output panoramas required for virtual head motion effects, the orientation between the panoramas may be required to stay consistent. This means that points at infinity may be fixed in the generated panoramas, e.g., be at the same location. Let P and P' be two panoramas generated from extracting strips from a light filed by fixing the columns x and x', respectively. The respective angles with respect to a camera position of points at infinity in P and P' should be equal. FIG. 6 illustrates the effect of fixing points at infinity.

After this registration, a virtual head motion effect that mimics a sideways head motion may be achieved by tracking the sideways head motion of a user and selecting a panorama based on this information. This may directly transfer to the stereoscopic case where a selection of both the left and the right panorama may be based on the head position. The described approach may allow for a real-time head motion effect in stereo as it comes down to selecting two appropriate panoramas.

FIG. 6 illustrates an example of two output panoramas without (top two) and with (bottom two) fixing the panorama orientation. Fixing the orientation may result in an expected behavior of closer points 602 exhibiting stronger motion parallax than far points 604.

Returning to FIG. 1, one or more processors 104, external resources 124, one or more cameras 120, and/or other components may be operatively linked via one or more electronic communication links. For example, such electronic communication links may be established, at least in part, via a network 119. It will be appreciated that this is not intended to be limiting and that the scope of this disclosure includes implementations in which one or more processors 104, external resources 124, one or more cameras 120, and/or other components may be operatively linked via some other communication media (e.g., wired and/or wireless).

The external resources 124 may include sources of information, hosts, other entities outside of system 100 participating with system 100, and/or other resources. In some implementations, some or all of the functionality attributed herein to external resources 124 may be provided by resources included in system 100.

The one or more processors 104 may include communication lines or ports to enable the exchange of information with a network and/or other computing platforms. Illustration of one or more processors 104 in FIG. 1 is not intended to be limiting. The one or more processors 104 may include a plurality of hardware, software, and/or firmware components operating together to provide the functionality attributed herein to one or more processors 104. For example, one or more processors 104 may be implemented by a cloud of computing platforms operating together as one or more processors 104. In some implementations, one or more processors 104 may be incorporated into a computing platform, a server, and/or other devices.

Electronic storage 118 may comprise electronic storage media that electronically stores information. The electronic storage media of electronic storage 118 may include one or both of system storage that is provided integrally (i.e., substantially non-removable) with one or more processors 104 and/or removable storage that is removably connectable to one or more processors 104 via, for example, a port or a drive. A port may include a USB port, a firewire port, and/or other port. A drive may include a disk drive and/or other drive. Electronic storage 118 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 118 may include one or more virtual storage resources (e.g., cloud storage, a virtual private network, and/or other virtual storage resources). Electronic storage 118 may store software algorithms, information determined by processor(s) 104, information received from one or more cameras 120, and/or other information that enables one or more processors 104 to function as described herein.

Processor(s) 104 is configured to provide information-processing capabilities. As such, processor(s) 104 may include one or more of a digital processor, an analog processor, a digital circuit designed to process information, an analog circuit designed to process information, a state machine, and/or other mechanisms for electronically processing information. In some implementations, processor(s) 104 may be included in one or more of a server (not shown), a computing platform (not shown), individual ones of one or more cameras 120, and/or other devices. By way of non-limiting illustration, a server may include processor(s) 104 and may communicate with computing platforms via client/server architecture and/or other communication scheme. The server may be configured to provide features and/or functions of processor(s) 104 to users via computing platforms. In some implementations, one or more features and/or functions of processor(s) 104 may be attributed to individual computing platforms associated with users. By way of non-limiting illustration, individual computing platforms may obtain machine-readable instructions that are the same or similar to machine-readable instructions 106 such that features and/or functions of processor(s) 104 may be carried out locally at the individual computing platforms. In some implementations, one or more features and/or functions of processor(s) 104 may be attributed to individual cameras. By way of non-limiting illustration, individual cameras may obtain machine-readable instructions that are the same or similar to machine-readable instructions 106 such that features and/or functions of processor(s) 104 may be carried out locally at the individual cameras. A computing platform may include one or more of a desktop computer, a laptop computer, a smartphone, a tablet computer, and/or other computing platform. It is noted that in some implementations, system 10 may include one or more of one or more servers, one or more computing platforms, one or more cameras, and/or other components described herein yet not explicitly shown in FIG. 1.

Although processor(s) 104 is shown in FIG. 1 as a single entity, this is for illustrative purposes only. In some implementations, processor(s) 104 may include one or more processing units. These processing units may be physically located within the same device, or processor(s) 104 may represent processing functionality of a plurality of devices operating in coordination. The processor 104 may be configured to execute components 108, 110, 112, 114, and/or 116. Processor(s) 104 may be configured to execute components 108, 110, 112, 114, and/or 116 by software; hardware; firmware; some combination of software, hardware, and/or firmware; and/or other mechanisms for configuring processing capabilities on processor(s) 104.

It should be appreciated that although components 108, 110, 112, 114, and/or 116 are illustrated in FIG. 1 as being co-located within a single processing unit, in implementations in which processor(s) 104 includes multiple processing units, one or more of components 108, 110, 112, 114, and/or 116 may be located remotely from the other components. The description of the functionality provided by the different components 108, 110, 112, 114, and/or 116 described above is for illustrative purposes and is not intended to be limiting, as any of components 108, 110, 112, 114, and/or 116 may provide more or less functionality than is described. For example, one or more of components 108, 110, 112, 114, and/or 116 may be eliminated, and some or all of its functionality may be provided by other ones of components 108, 110, 112, 114, 116, and/or other components. As another example, processor(s) 104 may be configured to execute one or more additional components that may perform some or all of the functionality attributed below to one of components 108, 110, 112, 114, and/or 116.

Figure 8:
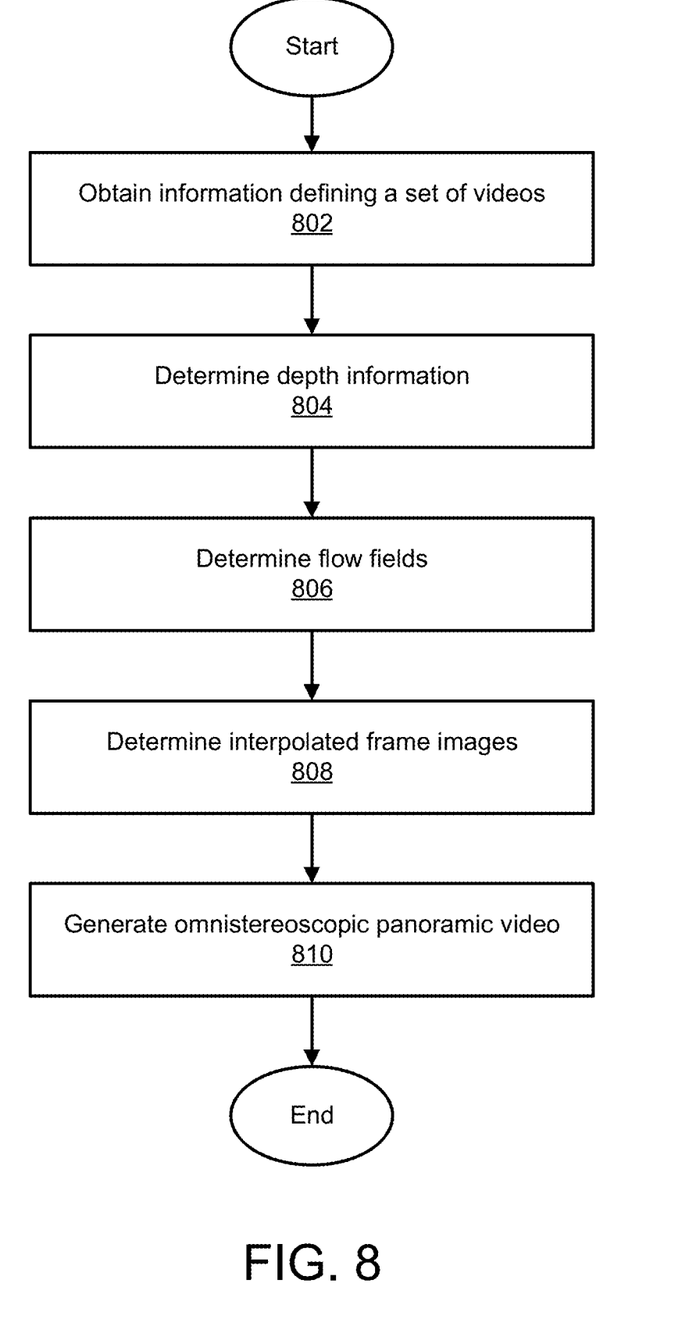
FIG. 8 illustrates a method for generating omnistereoscopic panoramic video, in accordance with one or more implementations.

FIG. 8 illustrates a method 800 of generating omnistereoscopic panoramic video. The operations of method 800 presented below are intended to be illustrative. In some implementations, method 800 may be accomplished with one or more additional operations not described, and/or without one or more of the operations discussed. Additionally, the order in which the operations of method 800 are illustrated in FIG. 8 and described below is not intended to be limiting.

In some implementations, method 800 may be implemented in a computer system comprising one or more of non-transitory electronic storage storing machine-readable instructions, one or more processing devices (e.g., a physical processor, a digital processor, an analog processor, a digital circuit designed to process information, an analog circuit designed to process information, a state machine, and/or other mechanisms for electronically processing information), and/or other components. The one or more processing devices may include one or more devices executing some or all of the operations of method 800 in response to instructions stored electronically on electronic storage medium. The one or more processing devices may include one or more devices configured through hardware, firmware, and/or software to be specifically designed for execution of one or more of the operations of method 800.

At an operation 802, information defining a set of videos may be obtained. Individual videos in a set of videos may include visual content and/or other content. The visual content of an individual video may include frame images. Individual frame images may be captured at individual points in time. The individual videos in the set of videos may depict at least part of a three-dimensional scene. The set of videos may be captured simultaneously by a camera array. For an individual point in time individual videos in a set of videos may include at least one frame image captured at the individual point in time. For an individual point in time, at least some of the frame images captured at the individual point in time may form an individual set of adjacent frame images at the individual point in time. In some implementations, operation 802 may be performed by one or more physical processors executing a video component the same as or similar to video component 108 (shown in FIG. 1 and described herein).

At an operation 804, depth information may be determined. Depth information may be determined by reconstructing the three-dimensional scene using obtained information defining a set of videos. Depth information may include three-dimensional coordinates of points lying on surfaces within a three-dimensional scene. In some implementations, operation 804 may be performed by one or more physical processors executing a depth component the same as or similar to depth component 110 (shown in FIG. 1 and described herein).

At an operation 806, flow fields between related pixels in adjacent frame images in individual sets of adjacent frame images formed at individual points in time may be determined. In some implementations, operation 806 may be performed by one or more physical processors executing a flow field component the same as or similar to flow field component 112 (shown in FIG. 1 and described herein).

At an operation 808, interpolated frame images between adjacent frame images in individual sets of adjacent frame images formed at the individual points in time may be determined. The interpolated frame images may be determined based on one or more of information defining a set of videos, depth information, flow fields, and/or other information. In some implementations, operation 808 may be performed by one or more physical processors executing an interpolation component the same as or similar to interpolation component 114 (shown in FIG. 1 and described herein).

At an operation 810, an omnistereoscopic panoramic video may be generated. The omnistereoscopic panoramic video may comprise frame images included in an obtained set of videos images, interpolated frame images, and/or other content. In some implementations, operation 810 may be performed by one or more physical processors executing a stitching component the same as or similar to stitching component 116 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation. It is to be understood that the present technology contemplates that one or more features of any claim can be dependent on and/or combined with one or more features of any other claim.

What is claimed is:

1. A system configured to generate omnistereoscopic panoramic video, the system comprising:
    one or more physical processors configured by machine-readable instructions to:
        obtain information defining a set of videos, individual videos in the set of videos including visual content, the visual content of an individual video including frame images, individual frame images being captured at individual points in time, the individual videos depicting at least part of a three-dimensional scene, the set of videos being captured simultaneously by a camera array such that for an individual point in time:
            individual videos in the set of videos include at least one frame image captured at the individual point in time, and
            at least some of the frame images captured at the individual point in time form an individual set of adjacent frame images at the individual point in time;
        determine depth information by reconstructing the three-dimensional scene using the obtained information defining the set of videos, the depth information including three-dimensional coordinates of points lying on surfaces within the three-dimensional scene;
        determine optical flow fields between related pixels in adjacent frame images in the individual sets of adjacent frame images formed at the individual points in time, the determination of the optical flow fields being based on a penalization function, a Jacobian, and a homography between the adjacent frame images induced by a plane at infinity;
        determine interpolated frame images between adjacent frame images in the individual sets of adjacent frame images formed at the individual points in time, the interpolated frame images being determined based on the information defining the set of videos, the depth information, and/or the optical flow fields; and
        generate an omnistereoscopic panoramic video, the omnistereoscopic panoramic video comprising the frame images included in the obtained set of videos images and the interpolated frame images.

2. The system of claim 1, wherein determining the interpolated frame images based on the information defining the set of videos, the depth information, and/or the optical flow fields comprises:
    identifying corresponding pixel between the adjacent frame images; and
    shifting individual pixels along individual interpolation paths.

3. The system of claim 2, wherein the individual interpolation paths comprise individual trajectories and individual spacing.

4. The system of claim 3, wherein the individual trajectories are determined based on the depth information to maintain geometric consistency with the three-dimensional scene.

5. The system of claim 1, wherein determining the depth information by reconstructing the three-dimensional scene comprises obtaining camera calibration parameters.

6. The system of claim 1, wherein generating the omnistereoscopic panoramic video is based on determining strips of the interpolated frame images and further based on blending the strips, wherein blending is based on the optical flow fields and/or the depth information.

7. The system of claim 1, further comprising a support structure for supporting the camera array, wherein individual cameras have individual angular fields-of-view, and wherein the camera array has an aggregate angular field-of-view.

8. The system of claim 1, wherein the three-dimensional scene is a real-world scene or a virtual scene.

9. A method of generating omnistereoscopic panoramic video, the method being implemented in a computer system comprising one or more physical processors and storage media storing machine-readable instructions, the method comprising:
    obtaining information defining a set of videos, individual videos in the set of videos including visual content, the visual content of an individual video including frame images, individual frame images being captured at individual points in time, the individual videos depicting at least part of a three-dimensional scene, the set of videos being captured simultaneously by a camera array such that for an individual point in time:
        individual videos in the set of videos include at least one frame image captured at the individual point in time, and
        at least some of the frame images captured at the individual point in time form an individual set of adjacent frame images at the individual point in time;
    determining depth information by reconstructing the three-dimensional scene using the obtained information defining the set of videos, the depth information including three-dimensional coordinates of points lying on surfaces within the three-dimensional scene;
    determining optical flow fields between related pixels in adjacent frame images in the individual sets of adjacent frame images formed at the individual points in time, the determination of the optical flow fields being based on a penalization function, a Jacobian, and a homography between the adjacent frame images induced by a plane at infinity;
    determining interpolated frame images between adjacent frame images in the individual sets of adjacent frame images formed at the individual points in time, the interpolated frame images being determined based on the information defining the set of videos, the depth information, and/or the optical flow fields; and generating an omnistereoscopic panoramic video, the omnistereoscopic panoramic video comprising the frame images included in the obtained set of videos images and the interpolated frame images.

10. The method of claim 9, wherein determining the interpolated frame images based on the information defining the set of videos, the depth information, and/or the optical flow fields comprises:

identifying corresponding pixel between the adjacent frame images; and shifting individual pixels along individual interpolation paths.

11. The method of claim 10, wherein the individual interpolation paths comprise individual trajectories and individual spacing.

12. The method of claim 11, wherein the individual trajectories are determined based on the depth information to maintain geometric consistency with the three-dimensional scene.

13. The method of claim 9, wherein determining the depth information by reconstructing the three-dimensional scene comprises obtaining camera calibration parameters.

14. The method of claim 9, wherein generating the omnistereoscopic panoramic video is based on determining strips of the obtained frame images and further based on blending the strips, wherein blending is based on the optical flow fields and/or the depth information.

15. The method of claim 9, further comprising a support structure for supporting the camera array, wherein individual cameras have individual angular fields-of-view, and wherein the camera array has an aggregate angular field-of-view.

16. The method of claim 9, wherein the three-dimensional scene is a real-world scene or a virtual scene.

* * * * *